Sept. 14, 1926.  1,599,923
H. G. REUBER
TRACTOR HITCH
Filed Jan. 30, 1926
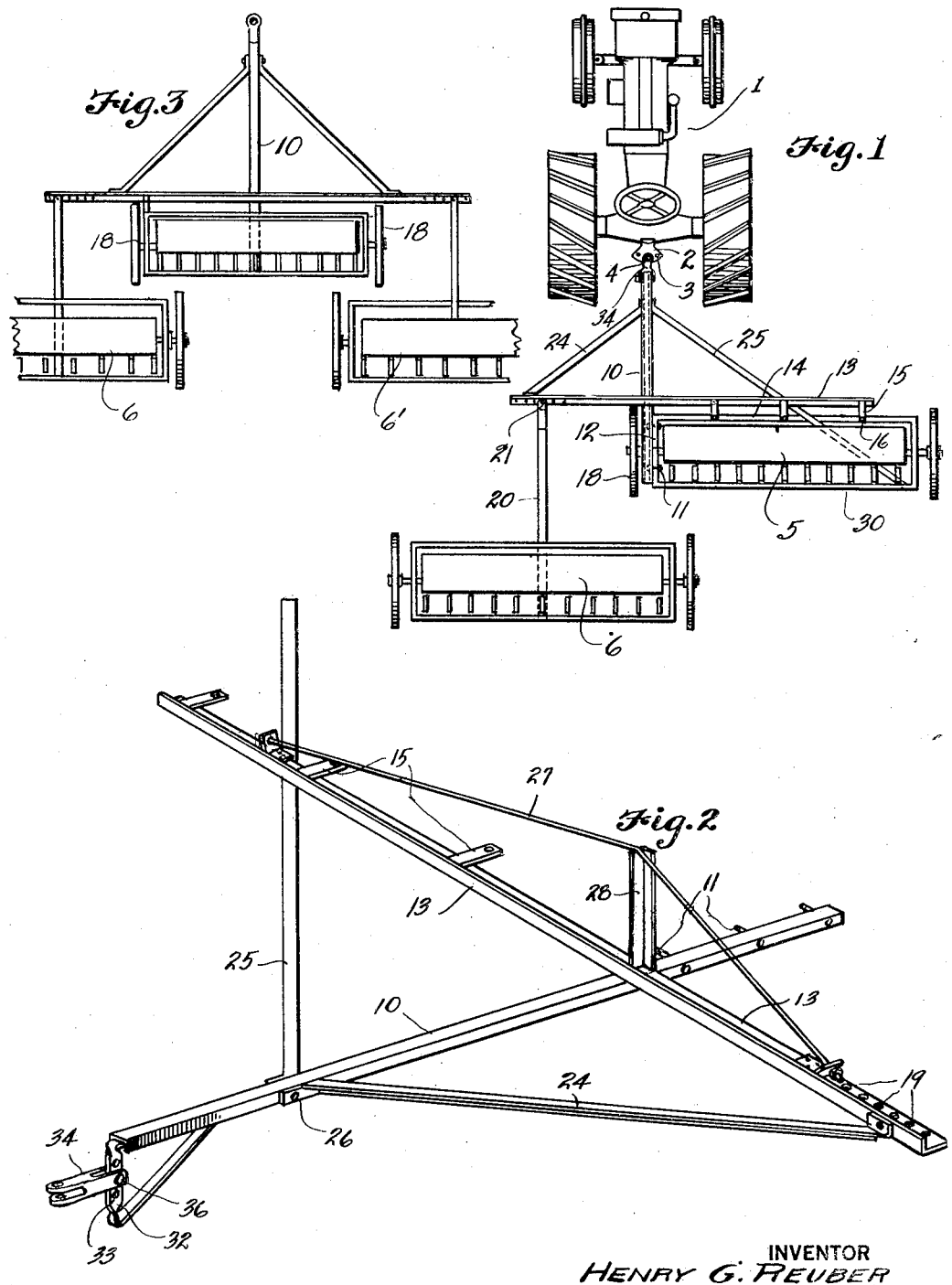
INVENTOR
HENRY G. REUBER
BY
Lynn A. Robinson
ATTORNEY Patented Sept. 14, 1926.

1,599,923

UNITED STATES PATENT OFFICE.

HENRY G. REUBER, OF ATWOOD, KANSAS.

TRACTOR HITCH.

Application filed January 30, 1926. Serial No. 84,859.

This invention relates to improvements in draft connections. More particularly it relates to an improved type of draft device commonly known as a tractor hitch whereby two or more grain drills, or other pieces of machinery, may be attached to a tractor.

The principal object of the present invention is to provide a tractor hitch that permits the making of sharp turns in either direction without causing the tractor to skid or pull side ways, as is usually the case, which keeps the trailing vehicles in proper alinement during the making of turns, which can be attached or removed easily and quickly and which can be manufactured at a relatively small cost as compared with most devices on the market at the present time.

Other objects of the invention reside in the various details of construction and combination of parts as will be hereinafter described.

In accomplishing these and other objects of the invention, I have provided the improved details of construction, the preferred forms of which are illustrated in the accompanying drawings, wherein—

Fig. 1 is a plan view of a tractor hitch embodied by the present invention, showing it as attached to a tractor and to two trailing grain drills.

Fig. 2 is a perspective view of the device detached from the machines.

Fig. 3 is a plan view showing an alternative type of construction used for three trailing drills.

Referring more in detail to the several views of the drawings—

1 designates what may be a tractor, or other power driven vehicle of a similar type, provided at the rear with a suitable draft device, here shown as consisting of a flat, horizontally disposed plate 2 provided with a series of holes 3 for receiving a connecting pin or bolt 4. The numerals 5 and 6 designate machines, such as grain drills, that are attached to and adapted to be drawn by the tractor by means of a hitch embodied by the present invention.

In its usual form of construction, the hitch comprises a draw bar 10 which, at its forward end, is connected, as presently described, to the draft device 2 of the tractor and, at its rearward end, overlies and is rigidly fixed by bolts 11, or other suitable means, to the end beam 12 of the frame structure of the drill or machine 5.

Bolted or riveted to the bar 10, near its rearward end so as to extend at right angles thereto, is a cross beam 13 which, at one side of the bar 10 extends parellel with the front longitudinal beam 14 of the frame of the drill 5 and is rigidly fixed thereto by means of a plurality of connecting straps or pieces of iron 15 which are riveted at their forward ends to the cross bar and at their rearward ends are detachably fixed by means of bolts 16 to the frame beam. The beam 13 is thus held sufficiently forward of the drill to clear the supporting wheels 18 at its ends.

The left hand end portion of the beam 13, as shown in Fig. 1, extends to that side a substantial distance and is provided with a series of holes 19 arranged in spaced relation longitudinally of the beam for the pivotal attachment thereto of the forward end of the tongue or draw bar 20 of the drill 6; any suitable connecting device, such as a pin 21 being used here to make the connection.

In order to rigidly brace and strengthen the cross beam 13, I have provided the two horizontal brace bars 24 and 25 which are attached by any suitable means, such as bolts 26, to the draw bar 10 near its forward end. The bar 24 extends rearwardly and laterally and is fixed to the beam 13 near the point where the tongue of the drill 6 is attached. The brace bar 25 extends rearwardly and laterally and is attached to the frame beam 14 with its end portion extended on for attachment to the rear longitudinal beam 30 of the frame of the machine; this end portion of the brace may be bent as necessary to avoid striking any of the working parts of the machine. This bar 25 not only braces the beam 13 but also serves as a means of preventing twisting downwardly of the frame of the machine relative to draw bar 10.

If it is desired a truss brace rod 27 may be attached, as in Fig. 2, at its ends to opposite ends of the cross beam 13 and extended over the upper end of a post 28 fixed vertically on the beam 13 where it crosses the draw bar 10.

To provide for raising or lowering the forward end of the draw bar 10 to proper working elevation, I have thereto a vertical, downwardly extending plate 32 provided with a plurality of vertically spaced apart holes 33. A clevis 34 is provided for connecting the plate 32 to the draft plate 2 of the traction device 1. The clevis is arranged to receive the vertical pin 4 for attaching it to the plate 2 and a horizontal pin 36 for attaching it to plate 32.

In Figure 3 I have illustrated an alternative construction for use when there are three trailing drills. In this construction the cross bar 13 extends equally at opposite sides of the frame of the drill 5 and the tongues of the trailing drills 6 and 6' are attached to its ends. The draft bar 10 is attached centrally to the bar 13 and is held rigid by suitable brace bars.

With devices so constructed and attached, it is possible to make relatively sharp turns in either direction without causing the tractor to pull sideways or to skid sideways as is usually the case. This being due to the fact that the line of pull is always toward the closest drill and is not swung laterally toward either of the trailing drills back of the forward drill.

It is further apparent that the second trailing drills may be so connected to the ends of the cross beam 13 that they will follow in proper alinement with the forward drill and will keep this alinement around turns due to the short connection that is possible.

It is to be understood that various changes in the details of construction may be made to adapt the device to drills of different kinds or to other machines and for this reason I do not wish to be limited only to the details of construction herein shown.

Having thus described my invention, what I claim as new therein and desire to secure by Letters-Patent, is:

1. A tractor hitch of the character described comprising a draw bar adapted for attachment at its forward end to a draft device of the tractor, a cross beam fixed rigidly to the draw bar equipped at spaced apart intervals along one end for rigid connection with the frame of a machine to be drawn and having its other end equipped for the connection thereto of another machine to be drawn.

2. A tractor hitch of the character described comprising a draw bar adapted for attachment at its forward end to the draft device of a tractor or the like and adapted for rigid connection along its rearward end to the frame of a machine to be drawn, a cross beam fixed rigidly to the draw bar near its rearward end and equipped along one end with means for rigid connection with the frame of the said machine to be drawn and having its other end equipped for the connection thereto of the tongue of another machine to be drawn thereby.

3. A tractor hitch of the character described comprising a draw bar provided with means at its forward end for attachment to the draft device of a tractor and provided along its rearward end with means for effecting a rigid connection with the end beam of the frame of a machine to be drawn thereby, a cross beam rigidly fixed to the draw bar near its rearward end and provided along one end with means for rigid attachment to the front beam of the frame of the said machine to be drawn and having its other end extended laterally from the said machine and provided with a series of holes for the reception of a pin for the attachment of the tongue of another machine to be drawn and brace bars fixed to the draw bar and to the end portions of the cross beam, with one of said brace bars extended beyond the cross beam for attachment to the forward and rearward beams of the frame of the first mentioned machine.

Signed at Atwood, Rawlins County, Kansas, this 25th day of January, A. D. 1926.

HENRY G. REUBER.